Feb. 23, 1926.
J. H. GILLIS
PEELER
Filed June 10, 1925
1,574,284
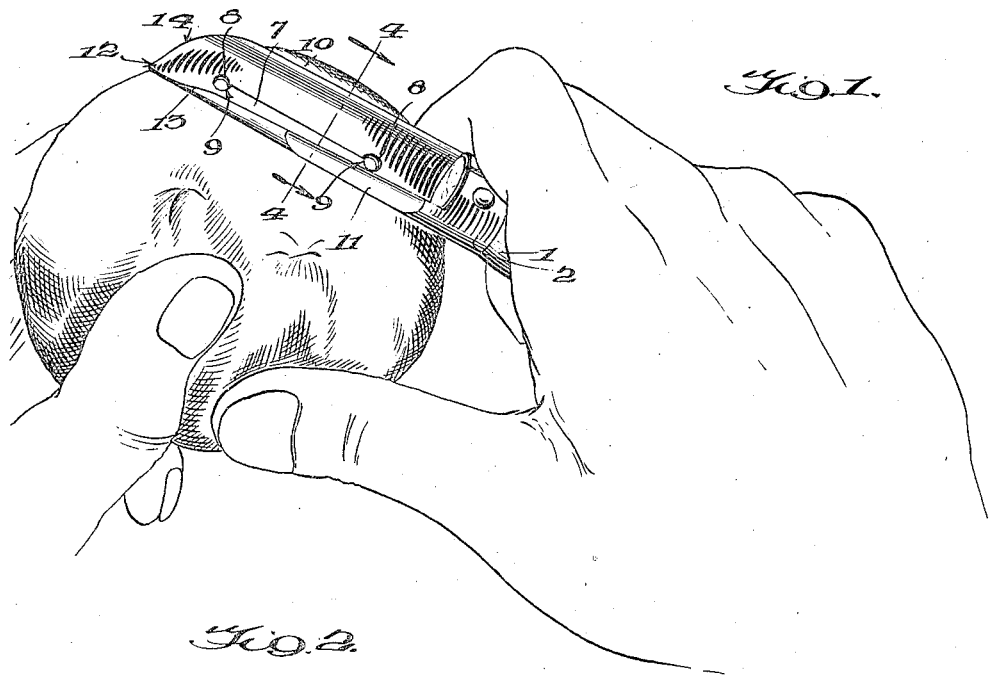
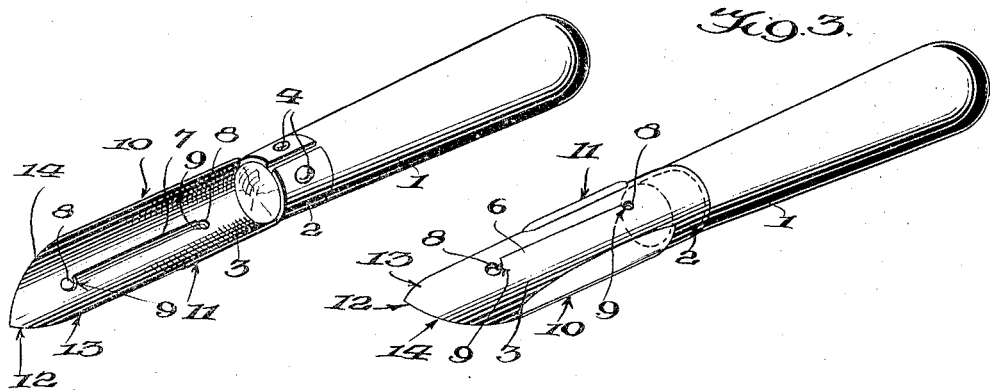
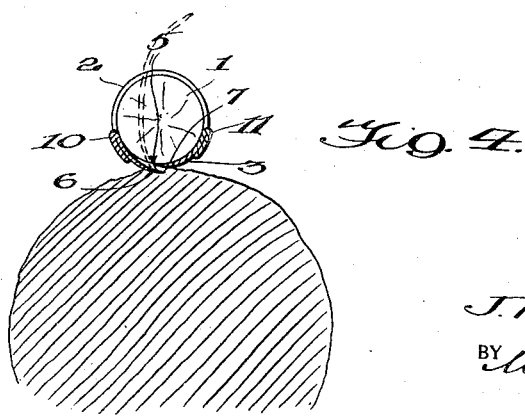
INVENTOR
J. H. Gillis,
BY
ATTORNEYS Patented Feb. 23, 1926.

1,574,284

UNITED STATES PATENT OFFICE.

JOHN H. GILLIS, OF GAINESVILLE, TEXAS.

PEELER.

Application filed June 10, 1925. Serial No. 36,167.

*To all whom it may concern:*

Be it known that I, JOHN H. GILLIS, a citizen of the United States, and a resident of Gainesville, in the county of Cooke and State of Texas, have invented certain new and useful Improvements in Peelers, of which the following is a specification.

This invention relates to improvements in peelers, and it consists substantially of the construction and arrangement herein described and claimed.

An object of the invention is to provide a device for peeling fruit, vegetables and the like, an important consideration being the novel disposition of the coring edge and a thumb guard which prevents abrasions of the thumb of the user.

Other objects and advantages appear in the following specification reference being had to the accompanying drawing, in which—

Figure 1 is a perspective view illustrating the improved peeler.

Figure 2 is a perspective view of the peeler as it appears on one side.

Figure 3 is a perspective view showing how it appears on the rear side.

Figure 4 is a section on line 4—4 of Figure 1.

In carrying out the invention provision is made of a handle 1 of wood or other suitable material to one end of which the ferrule 2 of the concave blade 3 is suitably affixed as at 4. In this connection it may be stated that the peeler is not necessarily made in two parts, namely the handle 1 and blade 3, it being regarded as within the spirit of the invention to make the peeler out of one part, the blade and handle being continuous.

A slot 5 in the bottom of the concave blade 3 furnishes a cutting or peeling edge 6 and a depth gauge 7. The edges of the slot 5 are turned or bent in opposite directions to produce the knife and gauge edges respectively. The extent to which the edge 7 is forced to the interior of the blade 3 determines the thickness of the peel from the fruit or vegetable. The ends of the slot 5 terminate in circular openings 8. These provide offsets at 9 which permit bending the two edges mentioned to better advantage.

The outside edges of the blade 3 are bent over at 10 and 11. The first of these bent over flanges is relatively long and reinforces that side of the blade. The second of the bent over edges is relatively short and reinforces the other side of the blade. Both of the bent over edges are actually flanges formed upon the edges of the blade. The flange 11 serves the specific purpose of a thumb guard, preventing abrasion of the skin when the peeler is moved toward the thumb in a manner directly understood from Fig. 1.

An abrupt point 12 provides for coring, that is to say for removing eyes and decayed places upon potatoes, cores from fruit, etc., and to facilitate the action the adjacent edge 13 between the point 12 and the thumb guard 7 is sharpened. The remaining rounded edge portion is left dull, but it may be sharpened if desired.

The operation is readily understood. The implement is held in one hand, as is customary with hand peelers, the knife 6 being scraped over the fruit or vegetable with a cutting or peeling action. The depth of the depth gauge 7 determines the thickness of the peel.

In peeling it is necessary to bring the thumb and forefinger up to the work (Fig. 1) in order to properly control the operation as in the case of the ordinary knife. When there is much peeling to be done the operator soon finds that the nearest edge of the peeler begins to make abrasions in the end of the thumb as well as in the end of the forefinger. In order to overcome this disadvantage the edges of the blade 3 are bent over at 10 and 11, thus providing guards and incidentally so rigidifying the blade as to render it quite stable.

It is observed that the point 12 is quite near the cutting or knife blade 6 thereby requiring but very little shifting of the ball of the thumb when using the point of the peeler for coring as already described. When so used, the ball of the thumb is placed in the concavity near the point 12. The peeler is given a little thrust into the fruit or vegetable, the thumb gauges the depth of the cut, whereupon a rapid turning motion follows resulting in the cutting out of the defect by means of the core edge 13.

In reference to the guards 10 and 11 it has been stated that these consist of bent over portions of the edges of the blade 3. These bent over portions consist of flanges formed at the edges of the blades when stamping it out. It is to be noted that the flanges are of such shape that they can be bent over to form the guards as intended but at the same time leave perfectly level edges. The coring edge 13 is a continuation of the guard 11, and the edge 10 merges nicely into the rounded point 14.

I claim:—

1. A peeler comprising a blade having a knife edge formed in the body thereof, and portions bent over at opposite edges of the blade both rigidifying the blade and providing guards for the thumb and forefinger of the hand operating the peeler.

2. A peeler comprising a handle, a concave blade having parallel edges, a point at which said blades terminate, said edges being rounded to meet the point, one of said edges being sharpened for coring, a knife edge formed in the body of the blade, said bent over portions at said parallel edges beginning at rounded portions and extending toward the handle, said bent over portions rigidifying the blade and providing guards.

3. A peeler comprising a handle, a concave blade having a ferrule fitted upon the handle, flanges formed on parallel edges of the concave blade, one being relatively long and the other relatively short, said flanges being bent over to rigidify the blade and provide finger guards, rounded portions of said parallel edges terminating in a point, the rounded portion and edge on the side of the relatively short flange being sharpened for coring, and a knife edge formed in the body of the concave blade.

4. A peeler having a concave blade provided with a cutting edge in its body and with a point at its outer end, said blade having diverting flanges at its sides adjacent to its inner end and forming finger guides, one of said sides having a cutting edge extending from the adjacent guard flange to the said point.

JOHN H. GILLIS.